United States Patent [19]

Miller

[11] Patent Number: 5,123,242
[45] Date of Patent: Jun. 23, 1992

[54] PRECOOLING HEAT EXCHANGE ARRANGEMENT INTEGRAL WITH MOUNTING STRUCTURE FAIRING OF GAS TURBINE ENGINE

[75] Inventor: Franklin E. Miller, Cincinnati, Ohio

[73] Assignee: General Electric Company, Cincinnati, Ohio

[21] Appl. No.: 559,781

[22] Filed: Jul. 30, 1990

[51] Int. Cl.$^5$ ................................................ F02K 3/02
[52] U.S. Cl. ...................................... 60/226.1; 60/266; 60/39.83; 165/40
[58] Field of Search ................. 60/39.07, 39.83, 226.1, 60/262, 266, 39.75; 165/39, 40, 124

[56] References Cited

U.S. PATENT DOCUMENTS

| | | | |
|---|---|---|---|
| 2,222,496 | 10/1940 | Belaieff et al. | 123/196 AB |
| 2,953,078 | 9/1960 | Best | 98/1.5 |
| 2,961,939 | 11/1960 | Typaldos | 98/1.5 |
| 2,979,916 | 4/1961 | Mason | 62/172 |
| 3,177,679 | 4/1965 | Quick et al. | 62/402 |
| 3,367,256 | 2/1968 | Townsend et al. | 98/1.5 |
| 3,401,191 | 11/1968 | Jackson | 98/1.5 |
| 3,486,435 | 12/1969 | Holt | 98/1.5 |
| 3,842,720 | 10/1974 | Herr | 98/1.5 |
| 4,187,675 | 2/1980 | Wakeman | 60/266 |
| 4,285,466 | 8/1981 | Linscheid et al. | 236/13 |
| 4,329,114 | 5/1982 | Johnston et al. | 415/145 |
| 4,351,150 | 9/1982 | Schulze | 60/226 R |
| 4,397,431 | 8/1983 | Ben-Porat | 60/39.093 |
| 4,474,001 | 10/1984 | Griffin et al. | 60/39.83 |
| 4,574,584 | 3/1986 | Hovan | 60/39.83 |
| 4,642,997 | 2/1987 | Krafka | 62/87 |
| 4,782,658 | 10/1988 | Perry | 60/226.1 |
| 4,791,782 | 12/1988 | Seed | 60/226.1 |
| 4,898,146 | 2/1990 | Stapensea | 165/40 |

FOREIGN PATENT DOCUMENTS

| | | | |
|---|---|---|---|
| 0820366 | 9/1959 | United Kingdom | 60/39.092 |
| 2085082 | 4/1982 | United Kingdom | 60/39.83 |
| 2152147 | 7/1985 | United Kingdom | 60/39.83 |

Primary Examiner—Richard A. Bertsch
Assistant Examiner—Michael I. Kocharov
Attorney, Agent, or Firm—Jerome C. Squillaro

[57] ABSTRACT

A precooling heat exchange arrangement includes a hollow fairing mounted on a forward side of an engine mounting structure extending radially across an annular fan duct of a gas turbine engine. The fairing has an aerodynamically-shaped external wall disposed in the main air-flow through the fan duct, spaced upper and lower internal plenums and a middle internal plenum disposed therebetween and sealed therefrom. A conduit routes hot bleed air flow from the engine to and from the lower and upper plenums of the fairing and at least one heat exchanger is mounted in the fairing. The heat exchanger includes a heat transfer structure having an interior in communication with the upper and lower plenums and having an exterior in communication with the fan duct air flow and the middle plenum of the fairing such that a fractional portion of fan duct air flow can divert from the fan duct and pass across the exterior of the heat exchanger in heat transfer relationship with the hot bleed air passing through the interior of the heat exchanger for cooling the hot bleed air. An air flow control mechanism is provided in communication with the middle plenum of the fairing for routing cool fan duct air flow to the core engine compartment after passing over the exterior of the heat transfer structure.

17 Claims, 5 Drawing Sheets

PRECOOLING HEAT EXCHANGE ARRANGEMENT INTEGRAL WITH MOUNTING STRUCTURE FAIRING OF GAS TURBINE ENGINE

CROSS-REFERENCE TO RELATED APPLICATION

Reference is hereby made to the following copending U.S. patent application dealing with related subject matter and assigned to the assignee of the present invention: "Heat Exchange Arrangement In A Gas Turbine Engine Fan Duct For Cooling Hot Bleed Air" by Franklin D. Parsons, assigned U.S. Ser. No. 561,139 and filed Aug. 1, 1990.

BACKGROUND OF THE INVENTION

1. Field of the Invention

The present invention relates generally to gas turbine engines and, more particularly, to a precooling heat exchange arrangement integral with a mounting structure fairing of a gas turbine engine for precooling high pressure hot bleed air.

2. Description of the Prior Art

Many commercial aircraft gas turbine engines employ high pressure hot air bled from the core engine compressor for use by different systems on the aircraft. In particular, the high pressure air is required by a variety of tasks on the aircraft, one such task being passenger cabin cooling. Prior to use of the air, the temperature of the air must be lowered to reasonable levels in accordance with the requirements of the specific task. For instance, air supplied for cooling the passenger cabin before the aircraft has ascended above approximately twenty thousand feet has to be first precooled by a heat exchanger and then finally cooled by an air conditioning system on the aircraft.

One current method of precooling the high pressure compressor bleed air is to extract or bleed air from the engine fan duct aft of the outlet guide vanes of the engine nacelle. The cooler bleed air from the fan duct and the high pressure hotter bleed air from the core engine compressor are then passed through a heat exchanger where the hotter high pressure air gives up some of its thermal energy to the cooler fan duct bleed air.

Use of the precooling heat exchange process is necessary, although, current systems for attaining heat transfer are unduly complex. In one system, an elaborate layout of piping is employed to pass the high pressure bleed air to the aircraft and to route the cooler fan duct bleed air to the location of the heat exchanger. By the time the cooler fan duct bleed air reaches the heat exchanger and performs its cooling task, it has lost most of its thrust potential due to frictional losses because of various bends and turns of the piping. As a result, the fan duct bleed air is discharged overboard at a loss to the propulsion system thermodynamic cycle.

Consequently, a need still remains for improvements in the arrangement for performing precooling heat transfer operations which will more fully utilize the cooler fan duct bleed air.

SUMMARY OF THE INVENTION

The present invention provides a precooling heat exchange arrangement designed to satisfy the aforementioned needs. The precooling heat exchange arrangement of the present invention is provided within the fairing of an engine mounting structure for cooling high pressure hot air, such as bled from an engine core compressor, by passing the hot bleed air through the precooling arrangement in the fairing and diverting a small fractional portion of the fan duct air flow from the fan duct and through the precooling arrangement in the fairing. The once used diverted fan duct air flow is then passed through the annular core engine compartment for use a second time in cooling of core engine components before discharge from the core engine compartment. As a result, the diverted fan duct bleed air is used twice before final discharge which at least partially offsets the effects of the loss to the propulsion system thermodynamic cycle.

Accordingly, the present invention is provided in a gas turbine engine which includes a core engine, a casing surrounding the core engine and defining an annular cooling compartment, an outer annular nacelle spaced radially outward from the casing and defining therebetween an annular fan duct for providing a main air flow through the engine which produces thrust, and an engine mounting structure extending radially between and interconnecting the nacelle and the casing. The present invention is directed to a precooling heat exchange arrangement which comprises: (a) a hollow fairing mounted on a forward side of the mounting structure across the main air flow through the fan duct; (b) means for routing a source of high pressure hot bleed air to the fairing; (c) at least one heat exchanger mounted in the fairing and including a heat transfer structure having an interior connected in communication with the routing means such that hot bleed air flow passes through the interior of the heat transfer structure, the heat transfer structure also having an exterior disposed in communication with the fan duct air flow such that a fractional portion of fan duct air flow can divert from the fan duct and pass across the exterior of the heat exchanger in heat transfer relationship with the hot bleed air passing through the interior of the heat exchanger for cooling the hot bleed air; and (d) an air flow control mechanism disposed in communication with and mounted to the fairing for causing the fan duct air flow portion to divert from the fan duct and flow across the exterior of the heat transfer structure and then to the core engine compartment for assisting in the cooling of components of the core engine.

More particularly, the fairing has an aerodynamically-shaped external wall disposed across the main air flow through the fan duct. Preferably, in one embodiment, the fairing external wall includes a pair of wall sections which meet at a leading edge, and a pair of heat exchangers are disposed in the fairing. Each heat exchanger is mounted in one of the wall sections. The fairing has spaced upper and lower internal plenums and a middle internal plenum disposed between and sealed from the upper and lower internal plenums.

The routing means includes an inlet nozzle in communication with one of the upper and lower internal plenums and an outlet nozzle in communication with the other of the upper and lower internal plenums. The routing means also includes a conduit connected to the inlet and outlet nozzles and in communication with the lower and upper plenums of the fairing such that hot bleed air flow passes through the interior of the heat transfer structure via the inlet and outlet nozzles and the lower and upper internal plenums of the fairing.

Further, the heat transfer structure exterior has an inlet side disposed in communication with the fan duct air flow and an outlet side in communication with the middle internal plenum of the fairing such that the portion of fan duct air flow can divert from the fan duct and pass across the exterior of the heat transfer structure and into the middle internal plenum. The flow control mechanism is disposed in communication with the middle internal plenum of the fairing.

In another embodiment, the fairing of the arrangement has an internal plenum and the heat exchanger is disposed within the fairing plenum. The air flow control mechanism is connected to the fairing in communication with the internal plenum thereof and is selectively operable for increasing and reducing fan duct air flow across the heat transfer structure exterior of the heat exchanger and into the fairing plenum. More particularly, the air flow control mechanism includes a pair of openable and closable valve doors pivotally mounted at a forward end of the fairing, and an actuator coupled to the valve doors and being selectively operable for regulating the degree of opening of the doors for controlling the fan duct air flow into the fairing plenum and to the heat exchanger therein.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
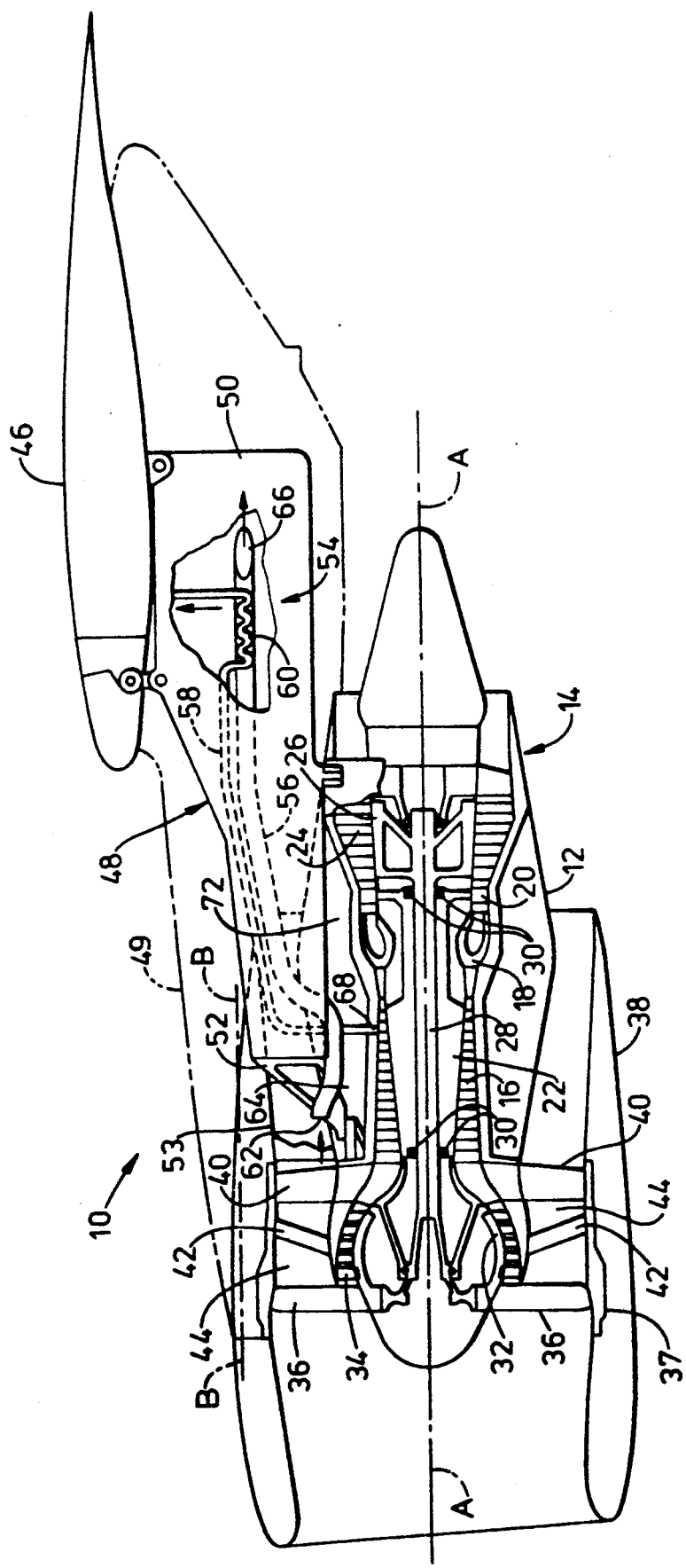
FIG. 1 is a schematic axial sectional view of a prior art gas turbine engine incorporating a prior art heat exchanger arrangement for cooling hot, high pressure air bled from the engine for use in different tasks on the aircraft.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a prior art gas turbine engine, generally designated 10, of an aircraft (not shown). The gas turbine engine 10 has a longitudinal center line or axis A and an annular casing 12 disposed coaxially and concentrically about the axis A. The engine 10 includes a core gas generator engine 14 which is composed of a compressor 16, a combustor 18, and a high pressure turbine 20, either single or multiple stage, all arranged coaxially about the longitudinal axis or center line A of the engine 10 in a serial, axial flow relationship. The high pressure turbine 20 is drivingly connected to the compressor 16 by an outer annular shaft 22.

The core engine 14 is effective for generating combustion gases. Pressurized air from the compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure power turbine 24.

The low pressure turbine 24 includes a rotor 26 which is fixedly attached to an inner drive shaft 28 and rotatably mounted within the outer drive shaft 22 via differential bearings 30. The inner drive shaft 28, in turn, mounts and rotatably drives a forward booster rotor 32 which forms part of a booster compressor 34. The compressor 34 supports a forward row of fan blades 36.

The engine 10 includes an annular forward nacelle 38 that houses the fan blades 36 and fan case 37 and is disposed about the stationary casing 12. The forward nacelle 38 is supported by a plurality of hinges (not shown) extending horizontally along the forward pylon 49, as represented along line B—B. Further, fan frame struts 40 and outlet guide vanes 42 interconnect the nacelle 40 and engine casing 12 and extend radially across an annular fan duct 44 defined therebetween. The engine 10 is supported from the underside of one of the wings 46 of the aircraft by an engine thrust-bearing mounting structure 48 composed of an upper pylon 50 and front engine mount 52, located in the upper bifurcation fairing 53.

Prior Art Heat Exchange Arrangement

As also seen schematically in FIG. 1, the prior art engine 10 incorporates a prior art heat exchange arrangement, generally designated 54. The heat exchange arrangement 54 is provided for cooling high pressure hot air bled from the engine 10 for use in different tasks on the aircraft. The prior art heat exchange arrangement 54 includes piping 56, conduit 58 and heat exchanger 60 supported by the thrust-bearing structure 48 in the form of the upper pylon 50 and front mount 52 within the upper bifurcation fairing 53.

The piping 56 of the prior art arrangement 54 has an inlet end 62 in the form of a scoop supported by an exhaust centerbody 64 of the casing 12 and projecting into the fan duct 44 and an outlet end 66 located in the region of the upper thrust-bearing structure 48 above and aft of the engine 10. The piping 56 at its inlet end 62 communicates with the fan duct 44 for bleeding a small proportion of the cooling air flow through the fan duct 44 and passing it over the exterior of the heat exchanger 60 before it reaches the outlet end 66 of the piping 56 where it is discharged overboard. The conduit 58 of the arrangement 54 has an inlet end 68 disposed in communication with the core engine compressor 16 for bleeding off a small proportion of high pressure hot air flow and passing it through the interior of the heat exchanger 60 where it is cooled before it is routed to the aircraft.

Due to the layout of the piping 56, the cooling air bled from the fan duct 44 has to flow around many bends and turns in the piping 56 before reaching the heat exchanger 60 and piping outlet 66. As a result of the frictional losses incurred by traveling along such flow path, the cooling bleed air no longer has any thrust potential and so is merely discharged overboard after it has performed its cooling task.

It should be further pointed out that the above description is of only one typical prior art arrangement. Other prior art arrangements have placed the heat exchanger 60 and associated ducting more forward in the thrust bearing structure 48 and in the core engine compartment. However, all such prior art arrangements have the same disadvantages of complex piping and aerodynamic thrust loss.

Precooling Heat Exchange Arrangement of the Present Invention

Figure 2:
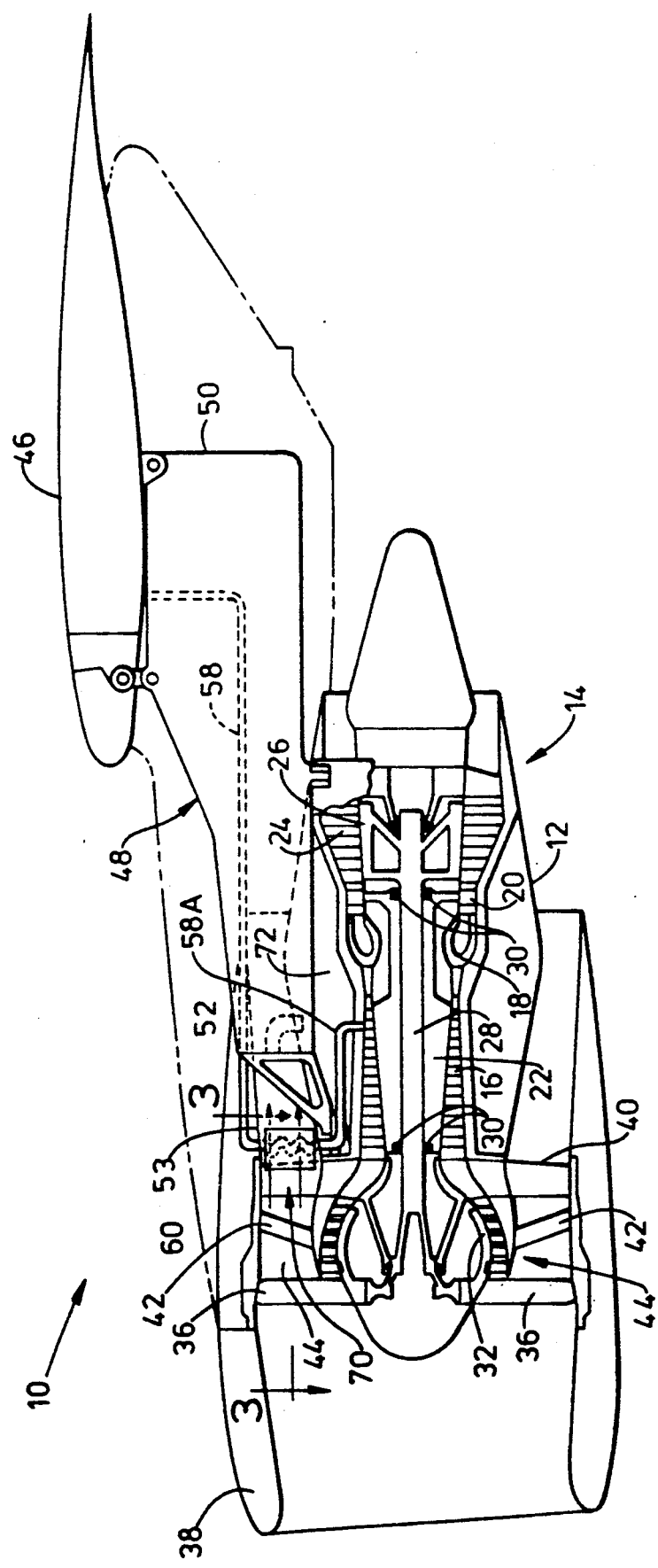
FIG. 2 is a schematic axial sectional view similar to FIG. 1 but illustrating a precooling heat exchange arrangement of the present invention incorporated by the gas turbine engine.

Turning now to FIG. 2, there is illustrated a precooling heat exchange arrangement of the present invention, generally designated 70. The precooling heat exchange arrangement 70 is provided in conjunction with the upper bifurcation fairing 53, commonly referred to as bifurcation 53, of the engine thrust-bearing mount structure 48 and the front engine mount 52. The precooling arrangement 70 is operable for cooling the high pressure hot air, such as bled from the engine core compressor 16, by passing the hot bleed air through the precooling arrangement and diverting a small fractional portion of the fan duct air flow from the fan duct 44 and through the precooling arrangement. The diverted fan duct air flow after being used a first time in the precooling arrangement 70 is then passed through an annular compartment 72 surrounding the core engine 14 for use a second time now in assisting in cooling of core engine components before discharge from the core engine compartment 72. As a result, the diverted fan duct bleed air is used twice before final discharge which at least partially offsets the effects of loss to the propulsion system thermodynamic cycle which was caused by diversion of the fraction of fan duct bleed air in the first place.

Figure 3:
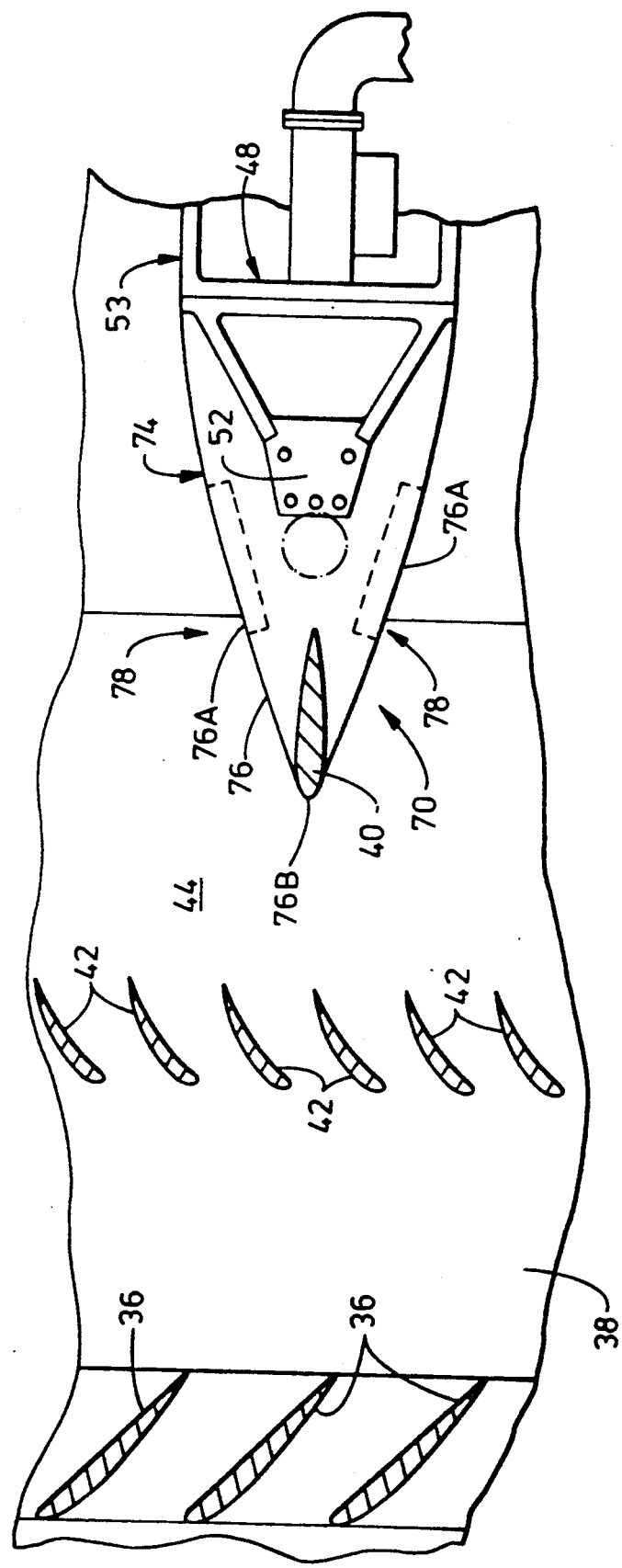
FIG. 3 is an enlarged fragmentary longitudinal sectional view of the precooling heat exchange arrangement of the present invention as seen along line 3—3 of FIG. 2.
Figure 4:
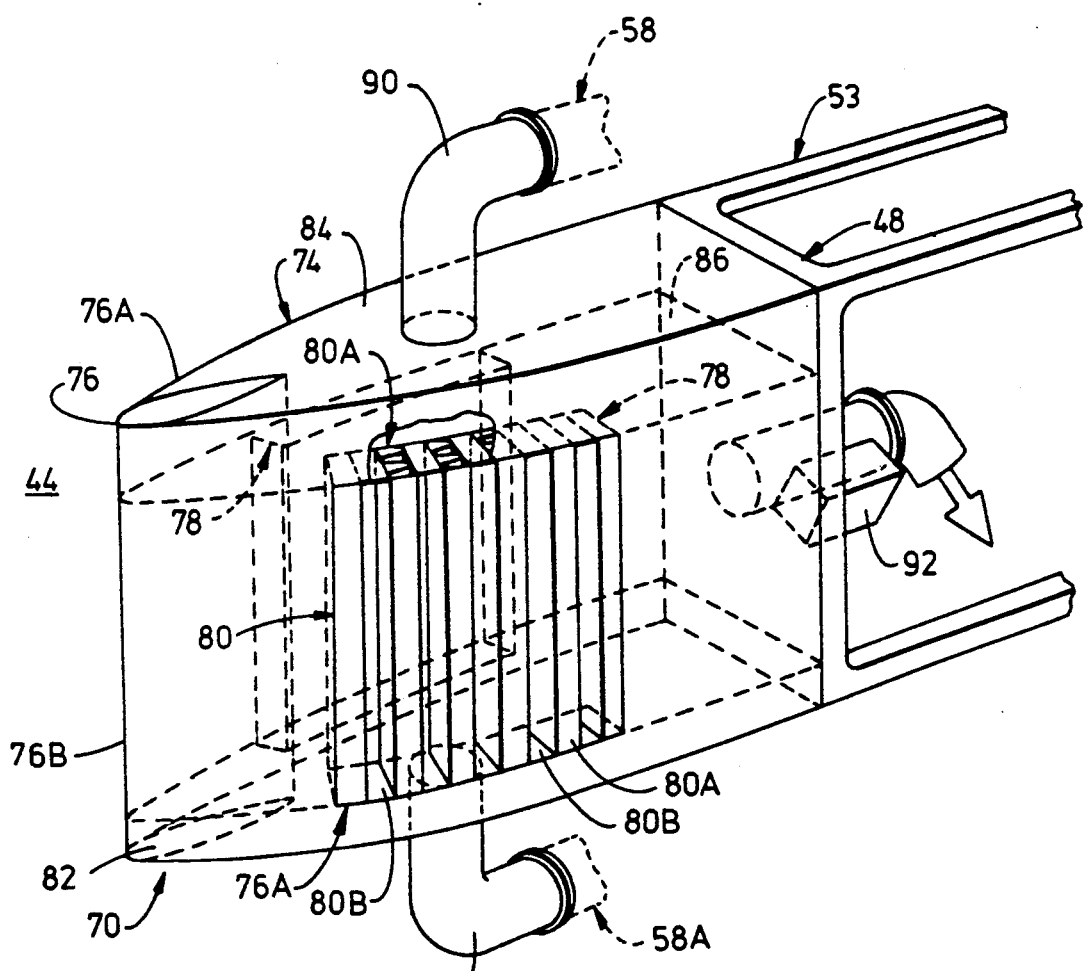
FIG. 4 is an enlarged perspective view of the precooling heat exchange arrangement of FIG. 3.

Referring to the embodiment illustrated in FIGS. 3 and 4, the precooling heat exchange arrangement 70 includes a hollow fairing 74 mounted on a forward side of the upper bifurcation 53 of the engine mounting structure 48 so as to extend radially across the annular fan duct 44 of the engine 10. The fairing 74 has a forwardly-tapered, aerodynamically-shaped external wall 76 disposed across the main cool fan air flow through the fan duct 44. In the one embodiment of FIGS. 3 and 4, the fairing external wall 76 is composed of a pair of wall sections 76A which meet at a leading radially-extending edge 76B so as to divide the fan air flow as it passes by the upper bifurcation 53.

The precooling heat exchange arrangement 70 also preferably includes a pair of heat exchangers 78. Each heat exchanger 78 is mounted in a respective one of the opposite wall sections 76A of the external wall 76 of the fairing 74. Each heat exchanger 78 includes a heat transfer structure 80, illustrated schematically in FIG. 4, having an interior 80A connected in communication with a section 58A (FIG. 2) of the conduit 58 such that hot bleed air flow passes through the interior 80A of the heat transfer structure 80. The heat transfer structure 80 of each heat exchanger 78 also has an exterior 80B disposed in communication with the fan duct air flow such that a fractional portion of fan duct air flow can divert from the fan duct and pass across the exterior 80B of the heat transfer structure 80 in heat transfer relationship with the hot bleed air passing through the interior 80A thereof for cooling the hot bleed air.

Also, the fairing 74 of the precooling arrangement 70 has spaced lower and upper internal plenums 82, 84 and a middle internal plenum 86 disposed between and sealed from the lower and upper internal plenums 82, 84. The exterior 80B of the heat transfer structure 80 at an exterior inlet side contiguous with the external wall sections 76A of the fairing 74 is in communication with the fan duct air flow and an interior outlet side is in communication with the middle internal plenum 86. Thus, a portion of fan duct air flow can be diverted from the fan duct 44 and pass across the exterior 80B of the heat transfer structure 80 and into the middle internal plenum 86.

In addition to the section 58A, the hot air conduit 58 includes an inlet nozzle 88 in communication with the lower internal plenum 82 and an outlet nozzle 90 in communication with the upper internal plenum 84. Thus, the conduit section 58A is connected to the inlet and outlet nozzles 88, 90 and in communication with the lower and upper plenums 82, 84 of the fairing 74 such that hot bleed air flow passes through the interior 80A of the heat transfer structure 80 via the inlet and outlet nozzles 88, 90 and the lower and upper internal plenums 82, 84.

The precooling heat exchange arrangement 70 further includes an air flow control mechanism 92 mounted to the upper bifurcation 53 and fairing 74. In the one embodiment of FIGS. 3 and 4, the air flow control mechanism 92 is a control valve disposed in communication with the middle internal plenum 86 of the upper bifurcation 53. Operation of the valve 92 by varying the degree to which it is open causes a portion of the fan duct air flow to divert from the fan duct 44 and flow across the exterior 80B of the heat transfer structure 80 and then to the core engine compartment 72 for assisting in the cooling of components of the core engine 14.

Figure 5:
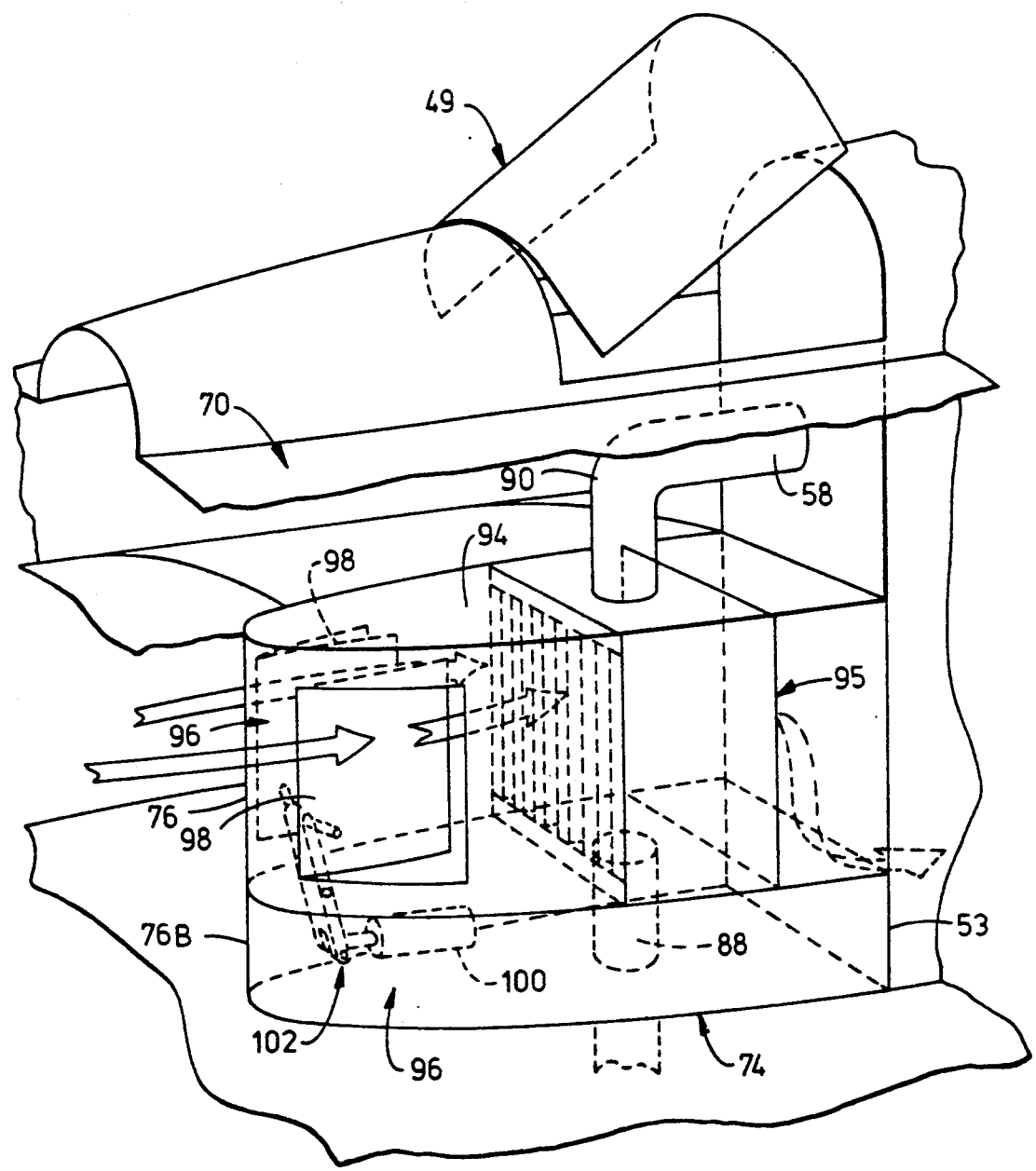
FIG. 5 is an alternative embodiment of the precooling heat exchange arrangement.

Referring to FIG. 5, in an alternative embodiment of the precooling arrangement 70, the fairing 74 has an internal plenum 94 and a heat exchanger 95 disposed within the fairing plenum 94. An alternative form of an air flow control mechanism 96 is connected to the fairing 74 in communication with the internal plenum 94 thereof. Now, the air flow control mechanism 96 is in the form of a pair of openable and closable valve doors 98 pivotally mounted at a forward end of the fairing 74, and an actuator 100, such as a hydraulic or pneumatic cylinder, and a pivotal linkage 102 are coupled to the valve doors 98. Selected extension and retraction of the actuator cylinder 100 will selectively regulate the degree of opening of the doors 98 for controlling (increasing or reducing) the fan duct air flow into the fairing plenum 94 and to the heat exchanger therein. By selectively operating the control mechanisms 92 (FIGS. 3 and 4) and 96 (FIG. 5), the flow of fan duct air can be reduced when the hot bleed air is at a lower temperature.

The cooling air in the core engine compartment 72 is normally discharged through aft facing annular slots at the rear of the compartment. This means of discharge is superior to discharging sideways into the free airstream in the forward portions of the nacelle 38. This use of precooler air for compartment cooling allows its discharge at an aerodynamically favorable location.

The precooling arrangement 70 of the present invention allows achievement of lower weight due to the use of fairing frame rather than brackets for support and use of plenum wall of valve mounting rather than duct supports. Also, it permits elimination of ducts and fairing walls by replacing with heat exchangers.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In a gas turbine engine including a core engine, a casing surrounding said core engine and defining an annular cooling compartment, an outer annular nacelle spaced radially outward from said casing and defining therebetween an annular fan duct for providing a main air flow through said engine which produces thrust, and an engine mounting structure extending radially between and interconnecting said nacelle and said casing, a precooling heat exchange arrangement comprising:
    (a) a hollow fairing mounted on a forward side of said mounting structure across the main air flow through said fan duct.
    (b) means for routing a source of high pressure hot bleed air to said fairing;
    (c) at least one heat exchanger mounted in said fairing and including a heat transfer structure having an interior connected in communication with said routing mans such that hot bleed air flow passes through the interior of said heat transfer structure, said heat transfer structure also having an exterior disposed in communication with the fan duct air flow such that a fractional portion of fan duct air flow can divert from said fan duct air flow into said hollow fairing and across said exterior of said heat exchanger in heat transfer relationship with the hot bleed air passing through said interior of said heat exchanger for cooling the hot bleed air; and
    (d) an air flow control mechanism in communication with and mounted to said fairing for causing the fractional air flow portion to divert from said fan duct air flow into said hollow fairing and across said exterior of said heat transfer structure and then to said core engine compartment for assisting in the cooling of components of said core engine.

2. The arrangement as recited in claim 1, wherein said fairing has an aerodynamically-shaped external wall disposed across the main air flow through said fan duct.

3. The arrangement as recited in claim 2, wherein:
said external wall includes a pair of wall sections which meet at a leading edge; and
a pair of said heat exchangers are disposed in said fairing, each heat exchanger being mounted in one of said wall sections.

4. The arrangement as recited in claim 1, wherein said fairing has spaced upper and lower internal plenums and a middle internal plenum disposed between and sealed from said upper and lower internal plenums.

5. The arrangement as recited in claim 4, wherein said routing means includes an inlet nozzle in communication with one of said upper and lower internal plenums and an outlet nozzle in communication with the other of said upper and lower internal plenums.

6. The arrangement as recited in claim 5, wherein said routing means also includes a conduit connected to said inlet and outlet nozzles and in communication said lower and upper plenums of said fairing such that hot bleed air flow passes through the interior of said heat transfer structure via said inlet and outlet nozzles and said lower and upper internal plenums of said fairing.

7. The arrangement as recited in claim 4, wherein said heat transfer structure exterior has an inlet side disposed in communication with the fan duct air flow and an outlet side in communication with said middle internal plenum of said fairing such that the portion of fan duct air flow can divert from said fan duct and pass across said exterior of said heat transfer structure and into said middle internal plenum.

8. The arrangement as recited in claim 4, wherein said air flow control mechanism is disposed in communication with said middle internal plenum of said fairing.

9. The arrangement as recited in claim 1, wherein:
said fairing has an internal plenum; and
said heat exchanger is disposed within said fairing plenum.

10. The arrangement as recited in claim 9, wherein said air flow control mechanism is connected to said fairing and disposed in communication with said internal plenum thereof, said mechanism is selectively operable for increasing and reducing fan duct air flow across said heat transfer structure exterior and into said fairing plenum.

11. The arrangement as recited in claim 10, wherein said air flow control mechanism includes:
    a pair of openable and closable valve doors pivotally mounted at a forward end of said fairing; and
    an actuator coupled to said valve doors and being selectively operable for regulating the degree of opening of said doors for controlling the fan duct air flow into said fairing plenum.

12. The arrangement as recited in claim 1, wherein said routing means includes a conduit connected in flow communication with a source of the bleed air flow of a temperature higher than that of the fan duct air flow, said conduit having a section extending to and from said fairing.

13. In a gas turbine engine including a core engine, a casing surrounding said core engine and defining an annular cooling compartment, an outer annular nacelle spaced radially outward from said casing and defining therebetween an annular fan duct for providing a main air flow through said engine which produces thrust, and an engine mounting structure extending radially between and interconnecting said nacelle and said casing, a precooling heat exchange arrangement comprising:
    (a) a hollow fairing mounted on a forward side of said mounting structure and having an aerodynamically-shaped external wall disposed in the main air flow through said fan duct, said fairing having spaced upper and lower interior plenums and a middle plenum disposed between and sealed from said upper and lower plenums;
    (b) means for routing a source of high pressure hot bleed air to said lower plenum and from said upper plenum of said fairing;
    (c) at least one heat exchanger mounted in said fairing and having a heat transfer structure with an interior and an exterior, said heat transfer structure interior disposed in communication between said upper and lower plenums, and said upper and lower plenums having respective inlet and outlet nozzles connected with said routing means such that hot bleed air flow passes through the interior of said heat transfer structure via said upper and lower plenums, said heat transfer structure exterior having an inlet side disposed in an opening in said external wall of said fairing in communication with the fan duct air flow and an outlet side in communication with said middle plenum of said fairing such that a fractional portion of said fan duct air flow can divert from said fan duct air flow into said middle internal plenum of said fairing and across said exterior of said heat exchanger in heat transfer relationship with the hot bleed air passing through said interior of said heat exchanger for cooling the hot bleed air; and (d) an air flow control mechanism in communication with said middle internal plenum of said fairing for routing to said core engine compartment after passing over said exterior of said heat transfer structure the fractional air flow portion diverted form said fan duct air flow for assisting in the cooling of components of said core engine.

14. The arrangement as recited in claim 13, wherein said external wall includes a pair of wall sections which meet at a leading edge.

15. The arrangement as recited in claim 14, further comprising a pair of said heat exchangers disposed in said fairing, each heat exchanger being mounted in one of said wall sections.

16. In a gas turbine engine including a core engine, a casing surrounding said core engine and defining an annular cooling compartment, an outer annular nacelle spaced radially outward from said casing and defining therebetween an annular fan duct for providing a main air flow through said engine which produces thrust, and an engine mounting structure extending radially between and interconnecting said nacelle and said casing, a precooling heat exchange arrangement comprising:

(a) a hollow fairing mounted on a forward side of said mounting structure and having an aerodynamically-shaped external wall disposed in the main air flow through said fan duct, said fairing having an internal plenum;

(b) means for routing a source of high pressure hot bleed air to said fairing;

(c) a heat exchanger mounted in said plenum and having a heat transfer structure with an interior and an exterior, said heat transfer structure interior connected in communication with said routing means such that hot bleed air flow passes through the interior of said heat transfer structure, said heat transfer structure exterior disposed in communication with said plenum of said fairing such tat a fractional portion of fan duct air flow can divert from said fan duct air flow through said internal plenum and across said exterior of said heat transfer structure in heat transfer relationship with the hot bleed air passing through said interior of said heat transfer structure for cooling the hot bleed air; and (d) an air flow control mechanism disposed in communication with said internal plenum of said fairing and being selectively operable for increasing and reducing said portion of the fan duct air flow through said plenum and across said heat transfer structure exterior for regulating the portion of cool fan duct air flow diverted from said fan duct air flow to said core engine compartment for assisting in the cooling of components of said core engine.

17. The arrangement as recited in claim 16, wherein said air flow control mechanism includes:

a pair of openable and closable valve doors pivotally mounted at a forward end of said fairing; and an actuator coupled to said valve doors and being selectively operable for regulating the degree of opening of said doors for controlling the fan duct air flow into said fairing plenum.

* * * * *